United States Patent [19]

Van Antwerp et al.

[11] Patent Number: 4,943,904
[45] Date of Patent: Jul. 24, 1990

[54] D.C. POWER UNIT ASSEMBLY INCLUDING UNITIZED SINGLE-PHASE D.C. POWER UNITS

[75] Inventors: Stanley R. Van Antwerp, Hudsonville; Mark B. Siehling, Allendale, both of Mich.

[73] Assignee: Conrac Corporation, Hudsonville, Mich.

[21] Appl. No.: 301,311

[22] Filed: Jan. 24, 1989

[51] Int. Cl.$^5$ ....................... H02M 1/00; B23K 11/24
[52] U.S. Cl. .................................... 363/144; 219/108; 219/116
[58] Field of Search ................ 219/108, 116; 363/126, 363/144

[56] References Cited

U.S. PATENT DOCUMENTS 3,081,424  3/1963  Dortort .............................. 363/144

FOREIGN PATENT DOCUMENTS 1263919  3/1968  Fed. Rep. of Germany ...... 363/144

Primary Examiner—Clifford C. Shaw
Attorney, Agent, or Firm—Price, Heneveld, Cooper, DeWitt & Litton

[57] ABSTRACT

The specification discloses a physically compact, low-inductance, high power-factor D.C. power unit assembly for producing rectified, multi-phase or single-phase, full-wave voltage. The assembly includes a plurality of single-phase, full-wave D.C. power units each having a planar rectified pad oriented perpendicular to the plane of the coil turns. The D.C. power units are aligned so that the rectified pads are coplanar. A common bus overlies and is electrically insulated from the rectified pads and is connected to the common terminal of each D.C. power unit. A pair of rectified buses are positioned on opposite sides of, and parallel to, the common bus. Each rectified pad is electrically connected at opposite ends to each of the rectified buses. The common bus is coaxial with the two rectified buses to permit an optimal power factor.

16 Claims, 9 Drawing Sheets

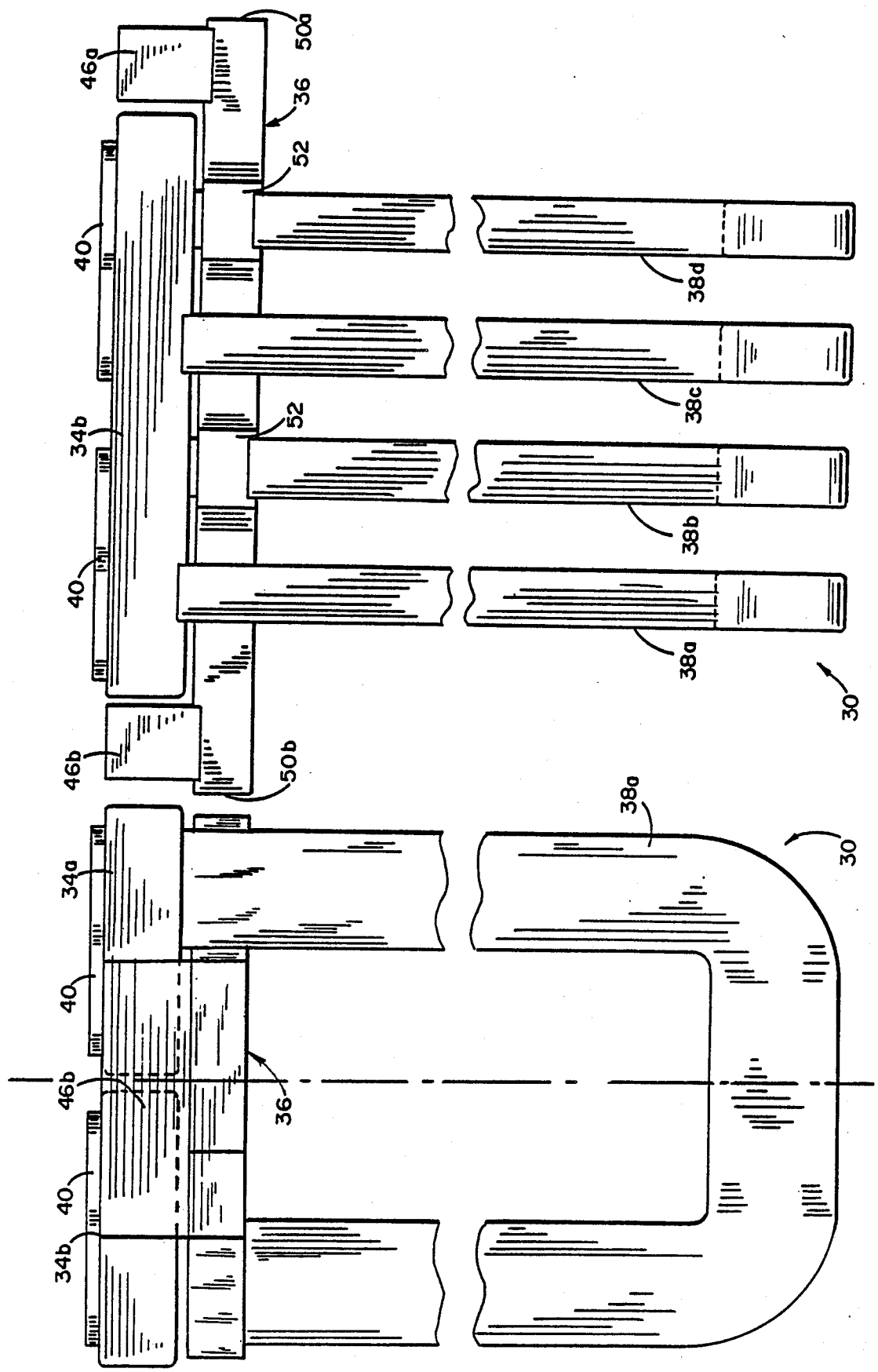

D.C. POWER UNIT ASSEMBLY INCLUDING UNITIZED SINGLE-PHASE D.C. POWER UNITS

BACKGROUND OF THE INVENTION

The present invention relates to a D.C. power assembly, and more particularly to a welding D.C. power assembly producing rectified, multi-phase, full-wave voltage.

A variety of D.C. power unit constructions have been developed for producing rectified, single and multi-phase, full-wave voltage. In one type, several single-phase, full-wave D.C. power units are yoked together to provide multi-phase or single-phase D.C. voltage. Examples of such constructions are illustrated in U.S. Pat. RE No. 31,444 issued Nov. 15, 1983 to Block, entitled TWO-PHASE TRANSFORMER AND WELDING CIRCUIT THEREFOR; and U.S. Pat. No. 3,840,720, issued Oct. 8, 1974 to Wolf, entitled THREE-PHASE TRANSFORMER-RECTIFIER ASSEMBLY FOR A WELDER.

Such D.C. power units are not without their drawbacks. First, the physical configuration of the rectification units for these transformers results in an undesirably large profile. Second, the rectification assemblies are relatively complicated increasing manufacturing costs, and subsequent inventory and servicing costs. Third, the electrical paths provided within these D.C. power units and the rectifier assemblies create inductive throats. In summary, prior D.C power units are bulky, inefficient, complicated, and/or expensive.

SUMMARY OF THE INVENTION

The aforementioned problems are overcome in the present invention providing a three-phase, full-wave D.C. welding power assembly having a rectification assembly which is both physically compact and of lower impedance than prior constructions. More particularly, the D.C. power unit assembly includes a plurality of yoked D.C. power units each including a rectified pad and a common terminal. The rectified pad conducts single-phase full-wave current and includes two opposite ends. A common bus extends across all of the D.C. power units between the opposite ends of each rectified pad and is connected to the common terminal of each transformer unit. A pair of rectified buses also extends over the individual D.C. power units and is generally parallel to the common bus to sandwich the common bus therebetween. The opposite ends of each rectified pad are connected to the two opposite rectified buses.

The present construction results in several distinct advantages. First, the construction provides an improved amperage or load balance between the multiple, yoked D.C. power units. Consequently, the construction permits a power factor close to unity, boosting the efficiency of the D.C. power unit. Second, the rectification and yoking construction provides relatively low impedance through the multiple current paths from each rectified pad to the rectified buses. Third, the rectification profile is relatively low or flat enabling the D.C. power unit to be used (1) in environments having limited space available and/or (2) on equipment capable of supporting limited weight.

These and other objects, advantages, and features of the invention will be more readily understood and appreciated by reference to the detailed description of the preferred embodiment and the drawings.

BRIEF DESCRIPTION OF THE DRAWINGS

FIG. 6 is a side elevational view of the secondary coils, common bus, secondary pads, and diodes of an individual transformer unit;

FIG. 7 is an end elevational view of the components shown in FIG. 6;

DETAILED DESCRIPTION OF THE PREFERRED EMBODIMENT

Figure 1:
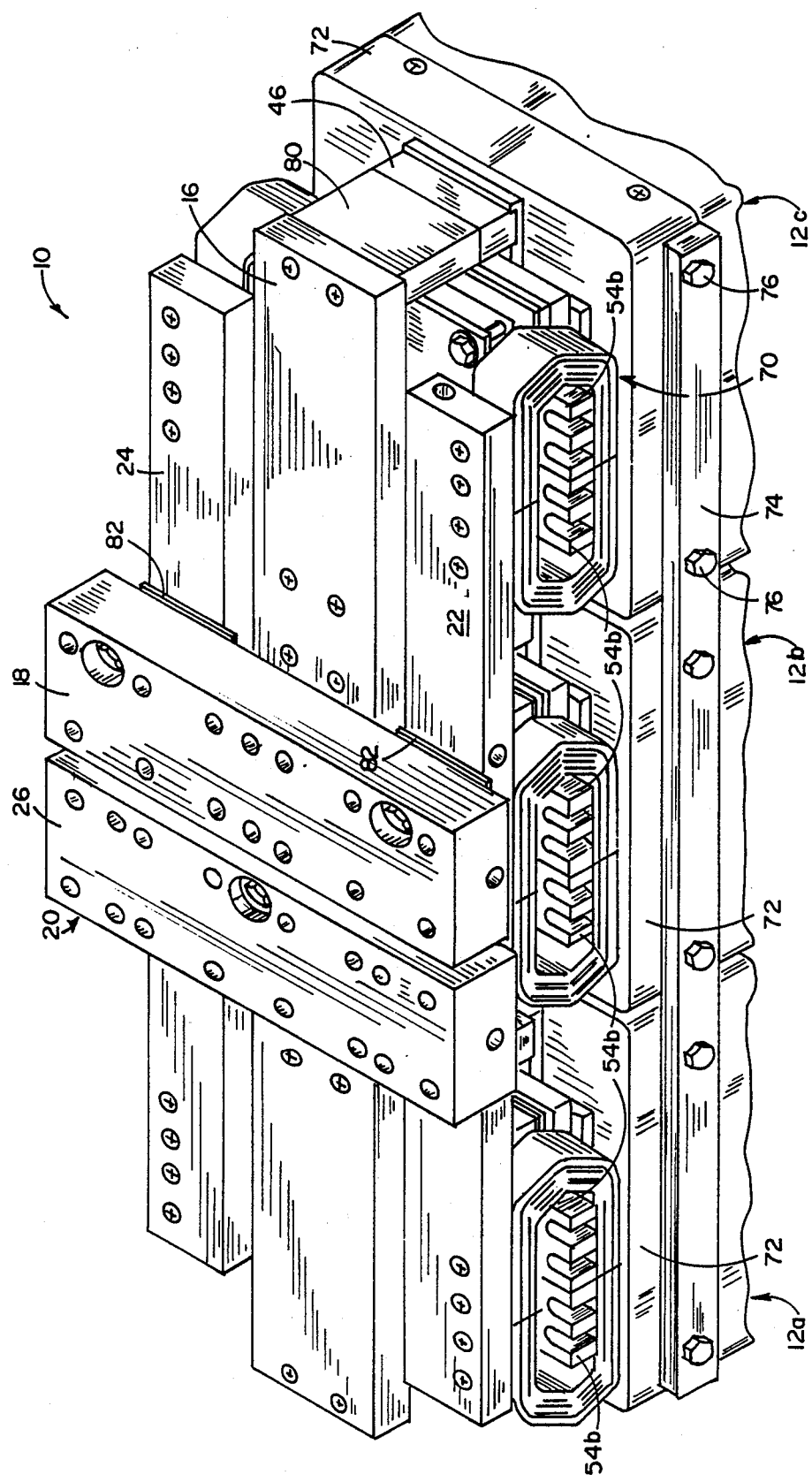
FIG. 1 is a fragmentary, isometric view illustrating the D.C. power unit assembly of the present invention.
Figure 2:
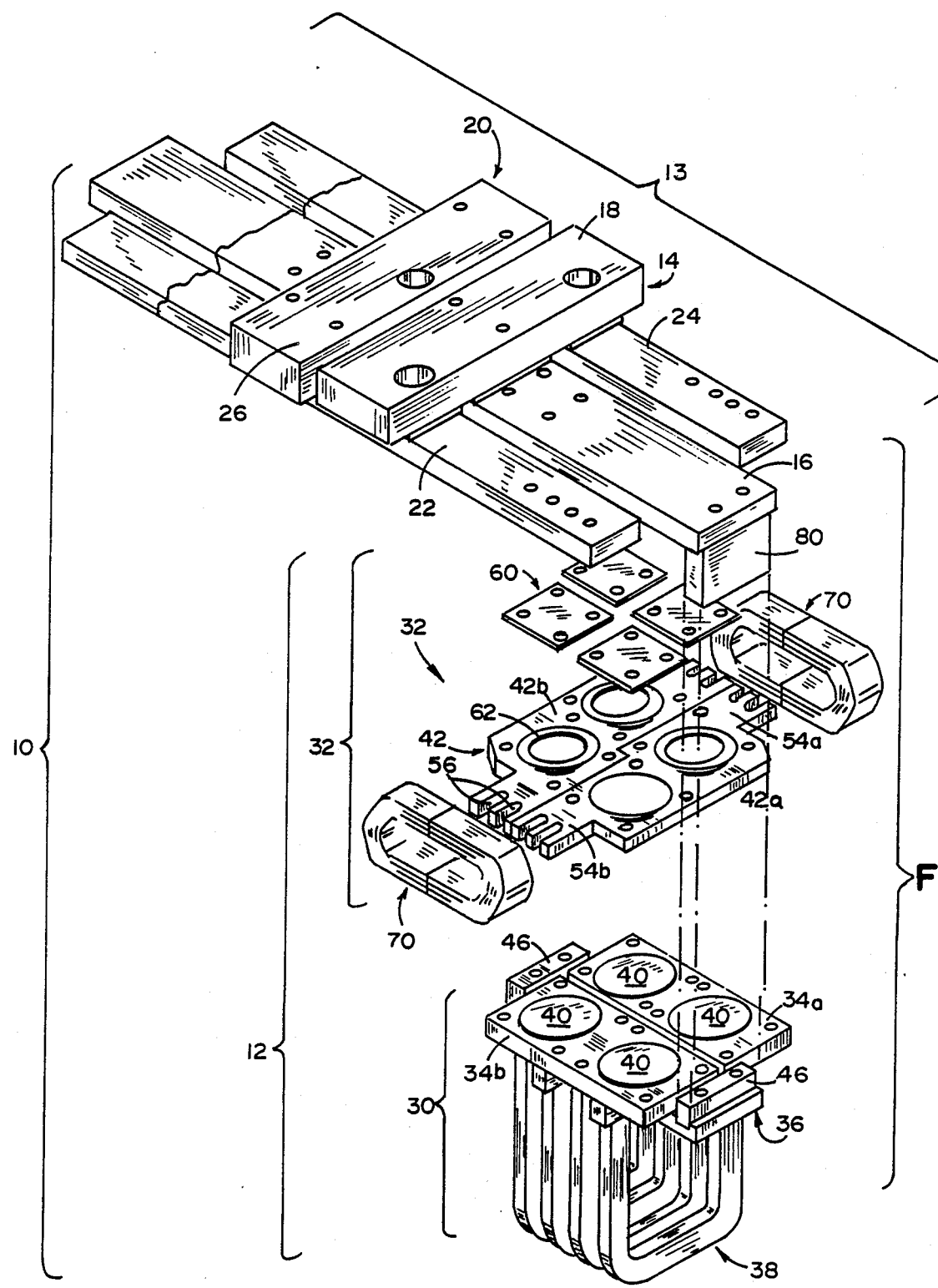
FIG. 2 is a perspective exploded view of the D.C. power unit assembly.
Figure 3:
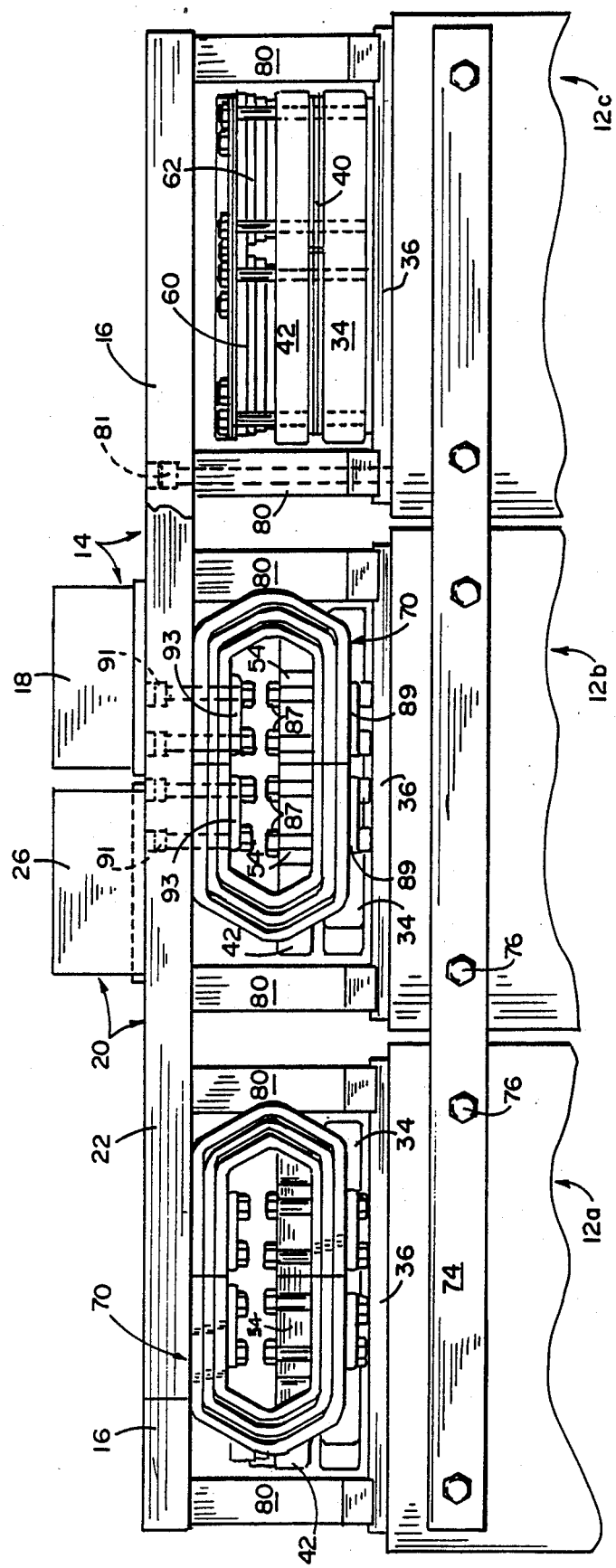
FIG. 3 is a fragmentary side elevational view of the D.C. power unit assembly.
Figure 4:
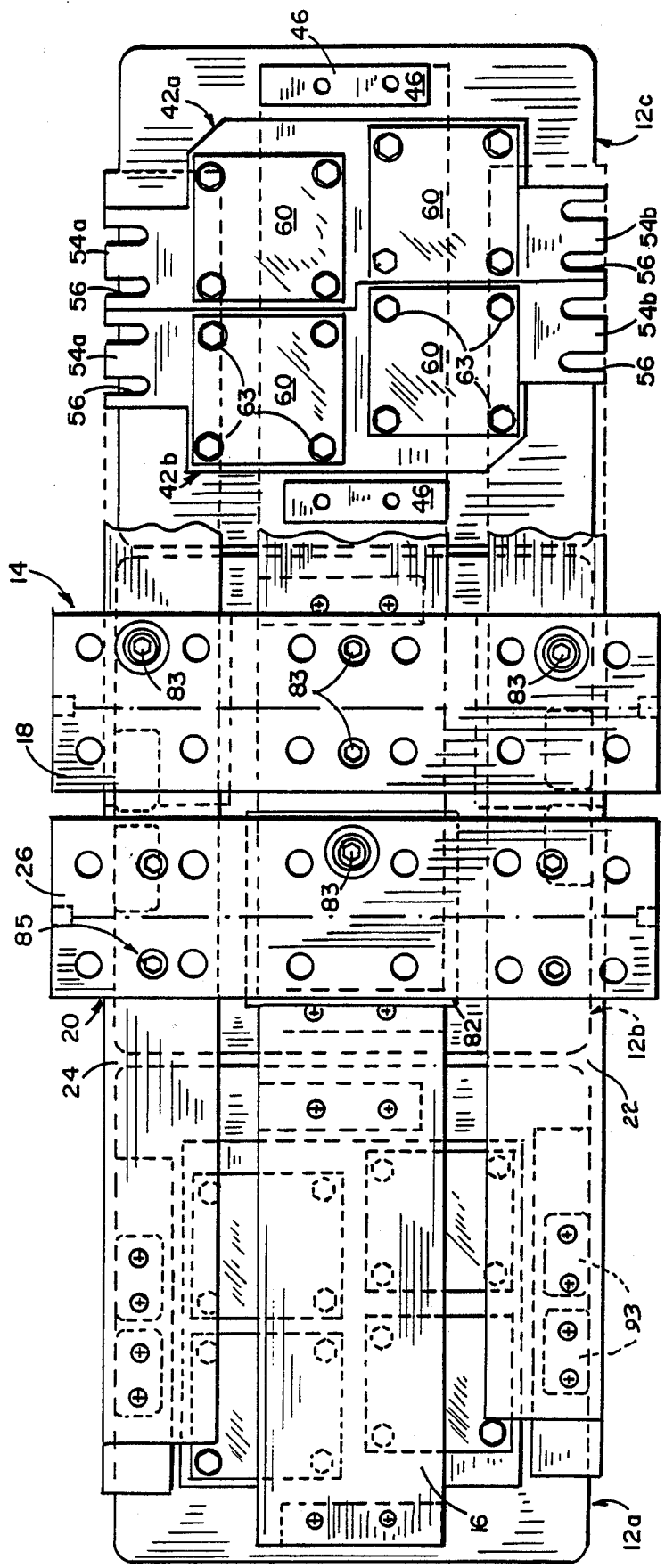
FIG. 4 is a top plan view of the D.C. power unit assembly.

A welding D.C. power unit assembly constructed in accordance with a preferred aspect of the invention is illustrated in FIGS. 1-5 and generally designated 10. Referring initially to FIGS. 1 and 2, the assembly 10 includes three D.C. power units 12a, 12b, and 12c, and a D.C. unitizing or yoke structure 13 for interconnecting the outputs of the three D.C. power units. The unitizing structure 13 includes a common bus assembly 14 including a common bus 16 and a common bus pad 18 and spacers 80; and a rectified bus assembly 20 including a pair of rectified buses 22 and 24 and a rectified bus pad 26. Each of the individual D.C. power units 12 outputs single-phase, full-wave voltage and/or current out of phase by 120 degrees from each other. The D C. unitizing structure 13 interconnects the individual D.C. power units so that rectified three-phase full-wave voltage is outputted on the rectified and common pads 26 and 18.

The three individual D.C. power units 12a, 12b, and 12c are identical to one another; and consequently only D.C. power unit 12c will be described in detail. Each of the D.C. power units 12 is similar to the D.C. power unit illustrated in U.S. Pat. No. 4,682,000 issued July 21, 1987 to Holt et al, entitled WELDING TRANSFORMER AND RECTIFIER ASSEMBLY, and assigned to the assignee of the present application. The disclosure of the Holt patent is hereby incorporated by reference.

The D.C. power unit 12c (see particularly FIG. 2) includes a transformer portion 30 and a rectifier pack or portion 32. The transformer portion 30 includes a pair of generally coplanar secondary connectors or pads 34a and 34b, a common bus 36, and a secondary coil 38. Each turn of the coil 38 includes a first end electrically connected to the common bus 36 and a second end electrically connected to one of the pads 34a or 34b. The common bus 36 is configured to permit the second end of each turn to extend therethrough without electrically contacting the common bus. The rectifier portion 32 includes a plurality of disk diodes 40 sandwiched against the secondary pads 34a and 34b and a pair of rectified buses 42a and 42b sandwiched against the diodes. A.C. voltage on the secondary pads 34 is rectified to single-phase, full-wave D.C. voltage on the rectified pads 42.

Each of the secondary pads 34, the coil 38, and the diodes 40 (FIGS. 2 and 6–8) are generally identical to those illustrated in the Holt patent. Consequently, the descriptions of these components will not be redescribed herein.

The common bus 36 is somewhat different from its counterpart in the Holt patent. The common bus 36 (FIGS. 6–8) is generally planar and includes a stem portion 48 terminating in opposite ends 50a and 50b. Two arms 52 extend in one direction from the stem portion 48, and two arms 54 extend in an opposite direction from the stem portion 48. The arms 52 and 54 are staggered along the length of the stem 48 so that they provide an attachment to alternating turns of the secondary coil 38. A void 56 is defined between each pair of adjacent arms 52 or 54 so that an opposite end of a coil turn can extend therethrough to connect to one of the secondary pads 34. A pair of connector pads 46 extend upwardly in a common direction from the opposite ends 50 of the common bus body 36 and ar generally perpendicular thereto. As perhaps best illustrated in FIGS. 6 and 7, the height of the connector pads 46 is selected so that the upper surfaces (as viewed in FIGS. 6 and 7) of the connector pads 46 and the secondary pads 34 are generally coplanar.

The primary difference between the common bus 36 of the present invention and the corresponding common bus in the Holt patent is the provision of two connections—namely pads 46a and 46b–instead of a single connection. Consequently, greater contact is provided between the common pad of each individual D.C. power unit and the conductor, such as the D.C. unitizing structure 13, to which it is attached. This reduces the impedance of the D.C. power unit and thereby increases its efficiency.

Figure 9:
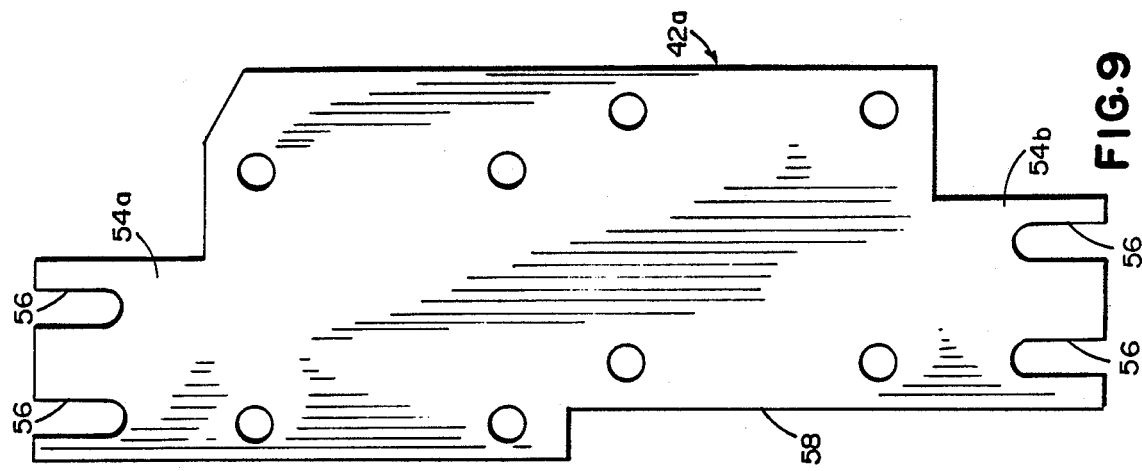
FIG. 9 is a top plan view of one of the rectified pad halves of a rectifier unit.
Figure 8:
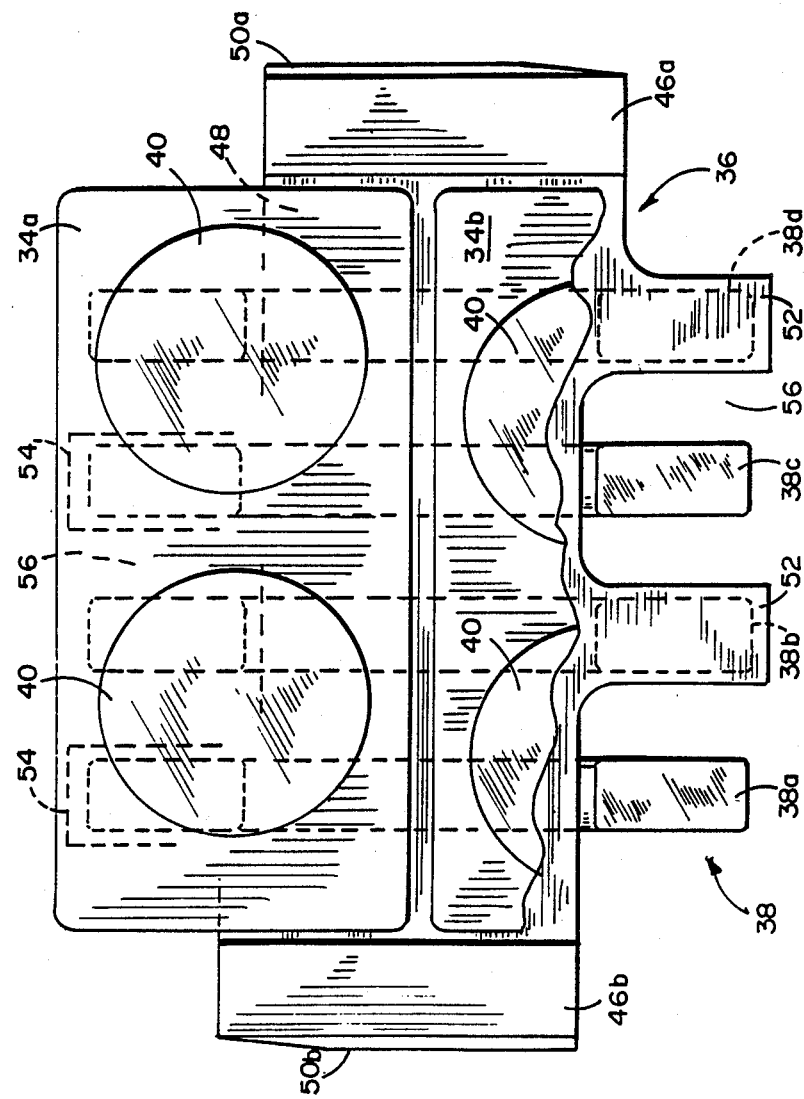
FIG. 8 is a top plan view partially broken away of the components shown in FIG. 6.

Each rectified pad 42 is also similar to its counterpart in the Holt patent. As illustrated in FIGS. 2 and 9, the rectified pad 42 is indeed two rectified pad halves 42a and 42b. Each pad half is generally identical to the other and therefore only pad half 42a will be described in detail. As illustrated in FIG. 9, the pad half 42a is smooth bar copper including a body portion having a pair of oppositely protruding ends 54a and 54b. Each of the ends 54 defines a pair of slots 56 for receiving connecting bolts to connect the rectified pad to a conductor. Other suitable means could be provided for electrically interconnecting the rectified pad ends 54 with the conductor. The mating edge 58 of the rectified pad half 42a is Z-shaped to interfit with the mating edge 58 of the opposite pad half. It is not necessary to electrically insulate the two pad halves; and indeed a certain amount of electrical conductivity therebetween can be beneficial to further reduce impedance.

The primary benefit of providing two pad halves 42a and 42b instead of a single rectified pad as in the Holt patent is to improve the surface contact between the diodes 40 and both the secondary pad 34 and the rectified pad half 42a or 42b between which the diode is sandwiched. Preferably, each pad half 42a engages a diode 40 on each of the two secondary pads 34 so that each pad half receives rectified current through the full-wave cycle of the transformer unit 30c. Again, such continual conductance by all pad halves reduces the impedance of the D.C. power unit and ultimately the D.C. power unit assembly. Providing electrical interconnections at each of the opposite pad ends also reduces impedance by enabling current to flow through a shortest and paralleled path to the D.C. unitizing structure to be described.

The spring assemblies (FIG. 2) are also generally identical to the spring assemblies described in the Holt patent. Specifically, one spring assembly, including a back-up plate 60 and one or more Belville spring washers 62, are positioned over each of the diodes 40 so that the spring force against each diode is independently adjustable. Bolts 63 (see FIGS. 4 and 5) extend around the Belville washers 62, through the back-up plate 60, and the rectified pad half 42 to be threadedly anchored in the secondary pads 34a and 34b. An insulating sleeve (not shown) is provided on each bolt 63 to electrically insulate the rectified pad half 42a or 42b and the spring assembly 60 from the secondary pad 34a or 34b.

Each transformer 30 includes a body clamp 72 (FIGS. 1 and 5) providing a means of physically interconnecting the transformer units 30. A connecting brace or strap 74 runs the full length of the adjacent transformers 30; and bolts 76 are inserted through the brace and into the body clamp 72 to retain the transformers in close physically parallel configuration. Consequently, the first rectified pad ends 54a of the D.C. power units 12 are linearly aligned with one another; and the second pad ends 54b are also linearly aligned with one another.

As described, each individual D.C. power unit 12 provides single-phase full-wave D.C. voltage on each of the rectified pad halves 42a and 42b. This voltage is provided in a manner conceptually identical to that described in the Holt patent. However, the physical configurations of the common bus 36 and the rectified pad 42 are altered in the present invention to reduce the impedance of the D.C. power unit and to provide an interconnection structure with the D.C. unitizing assembly 13 to be now described.

The D.C. unitizing structure 13 electrically interconnecting the three D.C. power units 12 is illustrated in FIGS. 1–5 and includes a common bus assembly 14, a rectified bus assembly 20, and a plurality of copper straps 70.

The common bus assembly 14 (FIGS. 1–5) includes a unitizing common bus 16, a common pad 18, and a plurality of common bus spacers 80. The unitizing common bus 16 extends substantially the full length of the interconnected D.C. power units and is generally flat. One of the spacers 80 interconnects the secondary connector pad 46 of each transformer 30 with the unitizing common bus 16. Consequently, the common bus is maintained in rigid fixed orientation with respect to the individual D.C. power units 12 and is interconnected to each of the two common connector pads 46 of each transformer. Bolts 81 (FIGS. 3 and 5) extend through the unitizing common bus 16 and the spacers 80 to be threadedly anchored in the connector blocks 46.

The common pad 18 is an elongated rectangular parallelepiped, elongated, and oriented generally perpendicularly to the unitizing common bus 16. The common pad 18 is physically connected by bolts 83 to the common bus 16 and each of the rectified buses 22 and 24. Insulator pads 82 are positioned between the common pad 18 and each of the rectified buses 22 and 24 to electrically insulate these pieces. Full surface electrical contact is maintained between the common pad 18 and the common bus 16 (see particularly FIG. 5) to provide a relatively wide conductive contact area of low impedance.

The rectified bus assembly 20 includes a pair of rectified buses 22 and 24 and a rectified bus pad 26 extending therebetween. The rectified buses or bus portions 22 and 24 are generally identical to one another; and both have a flat elongated configuration—preferably a rectangular parallelepiped. Each of the rectified buses 22 and 24 extends generally the full length of the aligned D.C. power units 12 to be electrically connected to the rectified bus pads 42.

The thickness of each rectified bus 22 and 24 is generally the same as the thickness of the common bus 16; and the rectified buses and the common bus are all coplanar. Further preferably, the two rectified buses 22 and 24 are evenly spaced from the common bus 16 so that the common bus 16 is equidistant from the two rectified buses throughout its length. The electrical consequence of such arrangement is that an improved amperage or load balance is provided between the multiple, yoked D.C. power units. This permits an increased power factor over prior multi-phase D.C. power units.

The rectified pad 26 is an elongated, rectangular, parallelepiped interconnecting the two rectified buses 22 and 24. The rectified pad 26 is physically connected by bolts 85 to each of the unitizing rectified buses 22 and 24 and also to the unitizing common bus 16. An insulating pad 82 is provided between the rectified bus pad 26 and the unitizing common bus 16 to electrically insulate these two pieces. Full surface electrical contact is maintained between the rectified pad 26 and the rectified buses 22 and 24 (see particularly FIG. 5) to provide a relatively wide conductive contact area of low impedance.

Each unitizing rectified bus 22 or 24 is aligned with the pad ends 54a or 54b of the D.C. power unit rectified pads 42. The unitizing rectified bus 22 or 24 is electrically interconnected to the rectified pad ends 54 by the copper straps 70. In the preferred embodiment, three copper straps are used for each interconnection; however, the number can be varied depending on a particular application. Each strap 70 is generally U-shaped and is dimensioned so that three such straps can be nested together at each interconnection. At one end, the straps 70 are connected by bolts 87 and anchor plate 89 (see FIG. 3) to the rectified pad end 54, and at the second end the copper straps are connected by bolts 91 and anchor plates 93 (see FIG. 3) to the rectified bus 22 or 24. The copper straps 70 are sufficiently physically flexible to accommodate thermal movement within the rectifier assembly of each D.C. power unit 12. Although the capability to accommodate such thermal expansion is provided between the rectified pads 42 and the rectified buses 22 and 24, it is envisioned that such flexibility could be built into other areas to meet a particular design criteria.

A primary coil (not shown) and a core (not shown) are installed in conjunction with the secondary coils 38 in conventional fashion. The secondary pads 34, the common bus 36, the coil 38, the primary coil, and the core are potted for electrical, thermal, and structural integrity.

OPERATION

Figure 10:
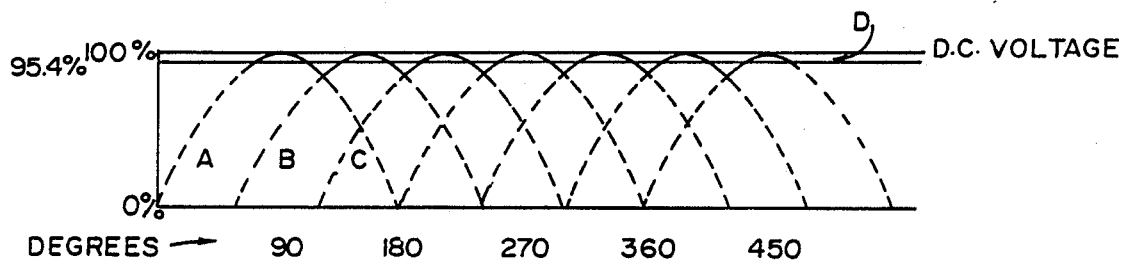
FIG. 10 is a graph illustrating the voltage outputs of the individual D.C. power units and of the D.C. power unit assembly.
Figure 5:
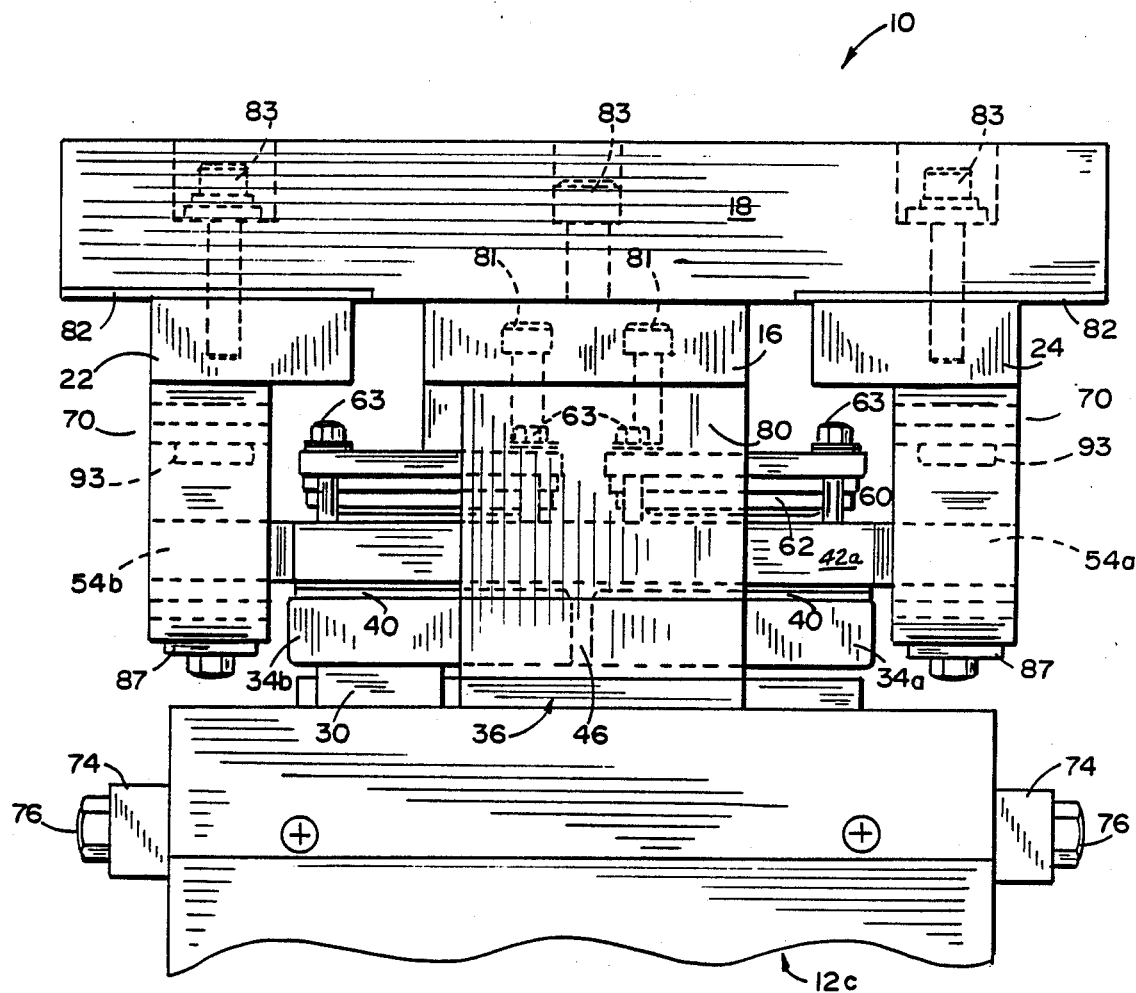
FIG. 5 is a fragmentary end elevational view of the D.C. power unit assembly.

The D.C. power unit assembly 10 interconnects or yokes the several D.C. power units 12 to unitize the individual rectified, single-phase, full-wave voltages produced by the individual D.C. power units to a rectified, three-phase, full-wave voltage on the pads 18 and 26. As briefly described above and as more thoroughly described in the Holt patent, each individual D.C. power unit 12 provides single-phase, full-wave, rectified voltage on its rectified pad 42. A primary voltage is applied to the primary coils (not shown); and a secondary voltage is induced in the secondary coils 38. As is generally well known to those having ordinary skill in the art, the output voltage at the three rectified pads is illustrated in FIG. 10 as phases A, B, and C respectively for D.C. power units 12a, 12b, and 12c wherein each rectified, single-phase, full-wave voltage is 120 degrees out of phase with the other two voltages. Since each of the rectified pads 42 is electrically coupled to both of the buses 22 and 24, the equivalent D.C. voltage on the rectified bus pad 26 is that illustrated as line D of FIG. 10. Specifically, this is a rectified, three-phase, full-wave voltage having an equivalent D.C. voltage which is 95.4 percent of the peak voltage of the individual D.C. power units.

The fact that the unitizing common bus 16 is coaxial with the two rectified bus portions 22 and 24 permits a power factor of nearly unity. This enables an improved load balance per phase over D.C. power unit constructions previously known.

Further, the provision of connecting means at each of two opposite ends of each D.C. power unit rectified pad 42 reduces the inductive throat through the assembly and thereby further improves efficiency. By mounting each rectified pad half 42a or 42b over diodes associated with the separate secondary pads of a transformer unit 30 enables each rectified pad half to be conductive at all times Again, this improves the efficiency of the D.C. power unit.

Accordingly, it will be appreciated that the present D.C. power unit has vastly decreased impedance and better load balance per phase as compared to prior yoked D.C. power unit constructions. Consequently, the D.C. power unit is capable of operating at increased efficiencies.

Alternative Embodiment

Figure 11:
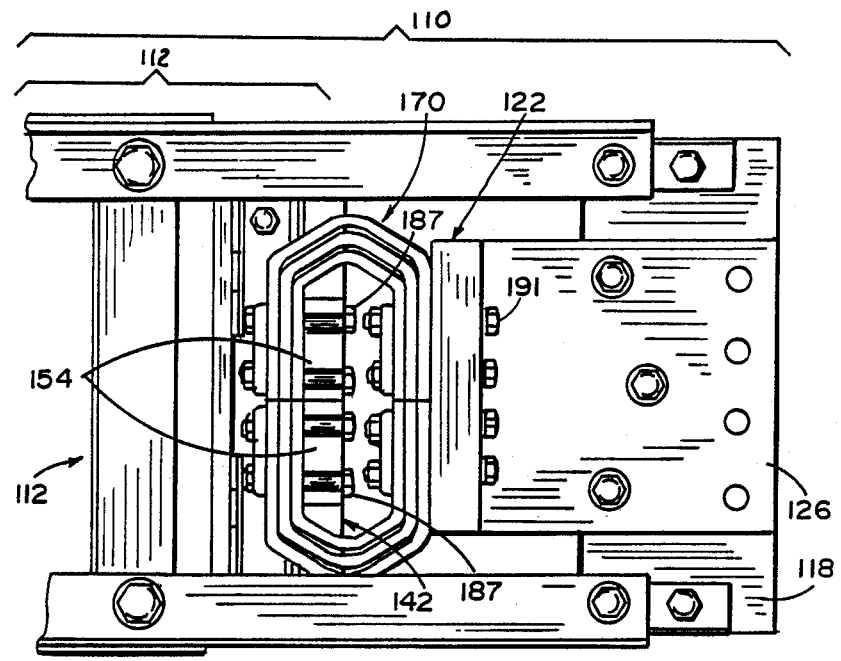
FIG. 11 is a top plan view of an alternate embodiment of the D.C. power unit.
Figure 12:
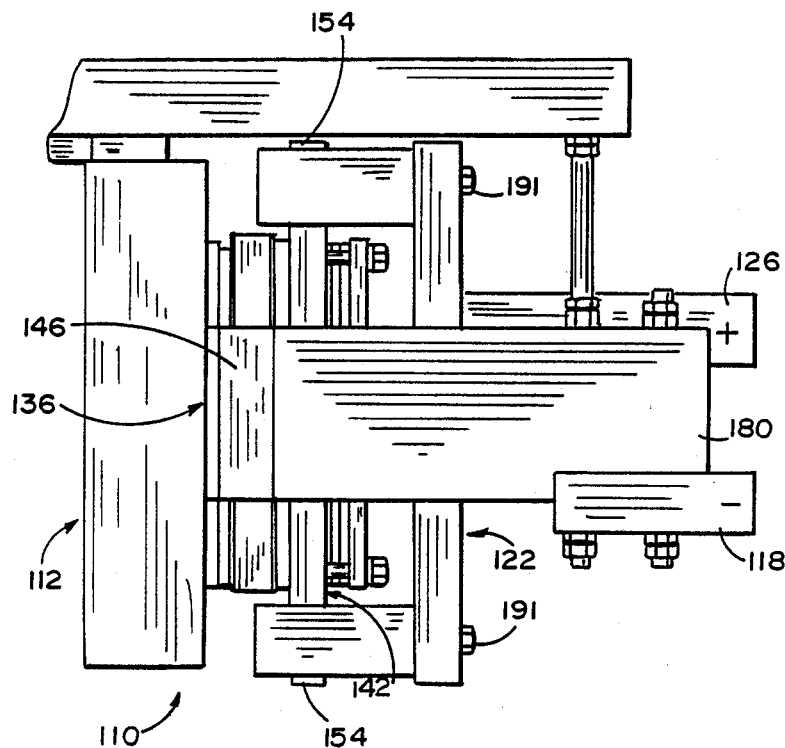
FIG. 12 is a side elevational view of the D.C. power unit assembly shown in FIG. 11.
Figure 13:
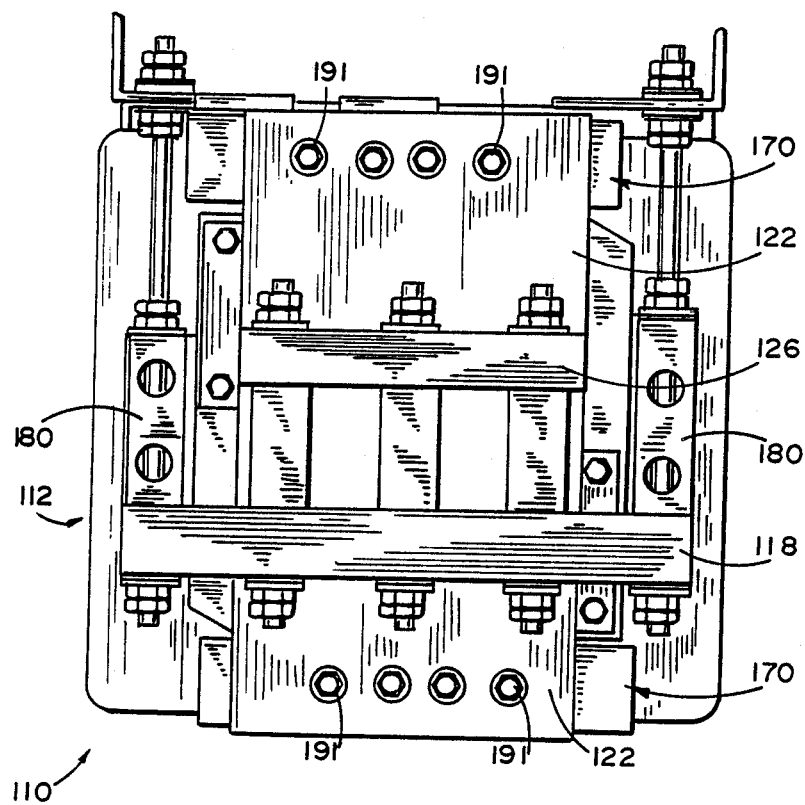
FIG. 13 is an end elevational view of the D.C power unit assembly shown in FIG. 11.

An alternate embodiment 110 of the D.C. power unit assembly is illustrated in FIGS. 11–13. This alternative embodiment illustrates the applicability of certain concepts of the above-described embodiment in conjunction with a single D.C. power unit 112. The D.C. power unit 112 is generally identical to that previously described; and like numbered elements preceded by 1 (e.g. 112 vis-a-vis 12) correspond accordingly. In particular, the rectified pad 142 includes two rectified pad halves having opposite ends 154. The copper straps 170 are bolted at one of their ends to the rectified pad ends 154 using bolts 187. The opposite ends of the straps 170 are bolted to a rectified bus 122 using bolts 191. A rectified pad 126 is electrically connected to and extends perpendicularly from the rectified bus 122. Similarly, the transformer includes a common bus 136 which includes connector blocks 146. A common bus spacer 180 is mounted to each common bus connector pad 146; and a common bus pad 118 extends between the two opposite connector pads.

CONCLUSION

The above descriptions are those of preferred embodiments of the invention. Alterations and changes can be made thereto without departing from the spirit and broader aspects of the invention as defined in the appended claims, which are to be interpreted in accordance with the principles of patent law, including the doctrine of equivalents.

The embodiments of the invention in which an exclusive property or privilege is claimed are defined as follows:

1. A D.C. power unit assembly comprising:
   a plurality of D.C. power units each including a rectified pad having first and second opposite ends, said first ends being generally linearly aligned with one another, said second ends being generally linearly aligned with one another, each D.C. power unit further having a common terminal;
   a first elongated rectified bus aligned with said first pad ends;
   a second elongated rectified bus aligned with said second pad ends;
   an elongated common bus directly between said first and second rectified buses and equidistant from each of said first and second rectified buses at any point along said common bus, whereby said common bus is coaxial with said two rectified buses together;
   first means for interconnecting said first pad ends to said first rectified bus;
   second means for interconnecting said second pad ends to said second rectified bus; and
   third means for connecting said common terminals to said common bus.

2. A D.C. power unit assembly as defined in claim 1 wherein said first and second rectified buses are electrically connected.

3. A D.C. power unit assembly as defined in claim 1 wherein said first and second rectified buses and said common bus ar generally flat and coplanar.

4. A D.C. power unit assembly as defined in claim 1 wherein selected ones of said first, second, and third interconnecting means are flexible to accommodate thermal movement.

5. A D.C. power unit assembly as defined in claim 1 wherein said rectified pads of said D.C. power units are relatively flat and coplanar.

6. A D.C. power unit assembly as defined in claim 1 wherein each of said D.C. power units includes a pair of said common terminals at opposite sides of said rectified pad, and further wherein said third interconnecting means interconnects both of said common terminals to said common bus.

7. A D.C. power unit assembly comprising:
   a plurality of D.C. power units each having a planar rectified pad and a common terminal, said planar pads being coplanar;
   a flat common bus overlying and spaced from said planar rectified pads, said common bus being parallel to said planar pads;
   a pair of flat rectified buses overlying said planar rectified pads, each of said rectified buses being parallel to said planar pads, said rectified buses being spaced from one another throughout their lengths, said common bus being located directly between and spaced from said rectified buses, whereby said common bus and said rectified bus present a low profile with respect to said pads;
   first means for electrically connecting each of said common terminals to said common bus; and
   second means for electrically connecting each of said pads to each of said rectified buses.

8. A D.C. power unit assembly as defined in claim 7 wherein said common bus is coaxial with said pair of rectified buses.

9. A D C. power unit assembly as defined in claim 7 wherein said pair of rectified buses are electrically interconnected.

10. A D.C. power unit assembly as defined in claim 7 wherein said common bus and said rectified buses are coplanar.

11. A D.C. power unit assembly as defined in claim 7 wherein said second connecting means is flexible to accommodate thermal expansion and contraction.

12. A D.C power unit assembly comprising:
    a plurality of D.C. power units each including a rectified pad for conducting rectified current, each rectified pad having first and second opposite ends, said first ends being located in a first area and said second ends being located in a second area, each D.C. power unit further including a common terminal;
    a common bus overlying and electrically insulated from said pads, said bus being located between said first and second pad ends throughout its length;
    a rectified bus assembly having first and second bus portions on opposite sides of said common bus;
    first means for electrically connecting each of said common terminals to said common bus; and
    second means for electrically connecting each of said first and second rectified pad ends to said first and second rectified bus portions, respectively.

13. A D.C, power unit assembly as defined in claim 12 wherein said common bus is coaxial with said rectified bus assembly.

14. A D.C. power unit assembly as defined in claim 12 wherein said common bus and said first and second bus portions are all coplanar.

15. A D.C. power unit assembly as defined in claim 12 wherein at least one of said first and second connecting means is flexible to permit relative movement.

16. A D.C. power unit assembly as defined in claim 12 wherein said rectified pads of said D.C. power units are coplanar.

* * * * *